(12) United States Patent
Huang et al.

(10) Patent No.: US 12,262,404 B2
(45) Date of Patent: Mar. 25, 2025

(54) INFORMATION TRANSMISSION METHOD AND APPARATUS UNDER OVERLAPPING OF MULTIPLE WIRELESS TRANSMISSIONS IN TIME DOMAIN

(71) Applicant: ZTE Corporation, Shenzhen (CN)

(72) Inventors: Shuanghong Huang, Shenzhen (CN); Youxiong Lu, Shenzhen (CN); Weimin Xing, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 398 days.

(21) Appl. No.: 17/635,765

(22) PCT Filed: Jul. 24, 2020

(86) PCT No.: PCT/CN2020/104647
§ 371 (c)(1),
(2) Date: Feb. 16, 2022

(87) PCT Pub. No.: WO2021/031796
PCT Pub. Date: Feb. 25, 2021

(65) Prior Publication Data
US 2022/0330266 A1    Oct. 13, 2022

(30) Foreign Application Priority Data

Aug. 16, 2019  (CN) .......................... 201910760049.X (51) Int. Cl.
*H04W 72/56* (2023.01)
(52) U.S. Cl.
CPC .................................. *H04W 72/56* (2023.01)
(58) Field of Classification Search
CPC .................................................... H04W 72/56
See application file for complete search history.

(56) References Cited

U.S. PATENT DOCUMENTS

2017/0367087 A1*  12/2017  Seo ....................... H04W 72/51
2018/0270822 A1*  9/2018  Chae ..................... H04W 28/04
(Continued)

FOREIGN PATENT DOCUMENTS

CA        3072524 A1    2/2019
CN      107889157 A     4/2018
(Continued)

OTHER PUBLICATIONS

International Search Report for corresponding application PCT/CN2020/104647 filed Jul. 24, 2020; Mail date Sep. 27, 2020.
(Continued)

*Primary Examiner* — Won Tae C Kim
(74) *Attorney, Agent, or Firm* — CANTOR COLBURN LLP (57) ABSTRACT

An information transmission method and apparatus are provided. The method includes: in a case where first wireless transmission and second wireless transmission overlap in a time domain, performing the following processing: comparing a first priority value corresponding to the first wireless transmission with a second priority value corresponding to the second wireless transmission, and discarding the wireless transmission corresponding to a higher priority value; or, comparing the first priority value corresponding to the first wireless transmission with a parameter value A, in a case where the first priority value is greater than or equal to the parameter value A, discarding the first wireless transmission, otherwise, discarding the second wireless transmission.

20 Claims, 3 Drawing Sheets

(56) References Cited

U.S. PATENT DOCUMENTS

| | | | |
|---|---|---|---|
| 2020/0187226 A1* | 6/2020 | Choi | H04W 72/566 |
| 2021/0029723 A1* | 1/2021 | Wu | H04W 72/569 |
| 2022/0070846 A1* | 3/2022 | Yang | H04L 5/0094 |

FOREIGN PATENT DOCUMENTS

| | | |
|---|---|---|
| CN | 109392126 A | 2/2019 |
| CN | 109644466 A | 4/2019 |
| CN | 110034905 A | 7/2019 |
| CN | 111083732 A | 4/2020 |
| EP | 3200367 A1 | 8/2017 |
| EP | 3282798 A1 | 2/2018 |

OTHER PUBLICATIONS

Written Opinion for corresponding application PCT/CN2020/104647 filed Jul. 24, 2020; Mail date Sep. 27, 2020.
European Search Report for corresponding application EP20854264; Report dated Jul. 29, 2022.

\* cited by examiner

In a case where first wireless transmission and second wireless transmission overlap in a time domain, the following processing is performed — S202

A first priority value corresponding to the first wireless transmission is compared with a second priority value corresponding to the second wireless transmission, and the wireless transmission corresponding to the relatively higher priority valuea higher priority value is discarded; or, the first priority value corresponding to the first wireless transmission is compared with a parameter value A, if the first priority value is greater than or equal to the parameter value Ain a case where the first priority value is greater than or equal to the parameter value A, the first wireless transmission is discarded, otherwise, the second wireless transmission is discarded, wherein the first priority value is contained in control information corresponding to the first wireless transmission, and the second priority value is contained in control information corresponding to the second wireless transmission — S204

INFORMATION TRANSMISSION METHOD AND APPARATUS UNDER OVERLAPPING OF MULTIPLE WIRELESS TRANSMISSIONS IN TIME DOMAIN

CROSS REFERENCE

This application is a National Stage Filing of the PCT International Application No. PCT/CN2020/104647 filed on Jul. 24, 2020, which claims priority to Chinese Application No. 201910760049.X filed on Aug. 16, 2019, the entirety of which is herein incorporated by reference.

TECHNICAL FIELD

The present disclosure relates, but is not limited to, the field of communication, and particularly to an information transmission method and apparatus.

BACKGROUND

For the in-band coexistence between synchronization signals/channels (between Sidelink Synchronization Signals (SLSSs for short)/Physical Sidelink Broadcast Channels (PSBCHs for short) and Sidelink Synchronization Signal/PSBCH Blocks (S-SSBs)) of Long Term Evolution (LTE) Vehicle to Everything (V2X) and New Radio (NR) V2X, the S-SSB including a Sidelink Primary Synchronization Signal (S-PSS) and/or a Sidelink Secondary Synchronization Signal (S-SSS) and/or a PSBCH, overlapping between a resource of the SLSS/PSBCH and a resource of the S-SSB may be avoided in a semi-persistent configuration/pre-configuration manner. Since a cycle of a synchronization resource of LTE V2X is fixed (160 ms), while no final conclusion has yet been reached for a cycle of a synchronization resource of NR V2X, there is a need for a solution to a resource conflict between synchronization signals/channels of LTE V2X and NR V2X.

For the coexistence between a Sidelink (SL) synchronization signal/channel and a service channel, since a time-domain duration of an SL resource pool is relatively long and an SL resource pool has a different configuration manner, for example, available resources of the SL resource pool may be configured in a bitmap manner, the configured SL resource pool may overlap synchronization resources of other Radio Access Technologies (RATs) in a time domain.

In such case, it is necessary to consider how to send signals/channels in a case where resources of SL synchronization signals/channels and resources of service channels of different RATs (LTE and NR) overlap.

On the other hand, a synchronization resource of NR V2X and an Uplink (UL) transmission resource of a cellular system may overlap (on a same carrier or different carriers) in the time domain. Therefore, it is necessary to consider the sending of SL synchronization signals/channels and service channels.

In NR V2X, an NR V2X module and an LTE V2X module may exist in the same User Equipment (UE), and NR V2X and LTE V2X may work on different carriers of the same band (in-band). Resources for SL transmission (sending/receiving) on different carriers under the two RATs may overlap in the time domain. Due to a radio frequency capability of the UE and the limit of half duplex, the UE cannot simultaneously implement SL sending or simultaneously implement SL sending and reception on two carriers in the same band (simultaneous reception on two carriers can be implemented by the UE). Therefore, it is necessary to consider how to send signals/channels of NR V2X and LTE V2X in a case where resources on two carriers overlap.

The in-device coexistence of service channels of LTE V2X and NR V2X is under research. There is yet no complete solution to the problem of how to send/receive service channels in a case where resources on two carriers overlap. Particularly, for how to send synchronization channels or service channels in a case where a resource of an SL synchronization signal/channel overlaps an SL resource (synchronization resource or a resource of a service channel) on another carrier, no related proposals are discussed.

For the problem in a related art of transmission conflict when transmission of different RATs overlaps in a time domain in the case of in-device coexistence, there is yet no effective solution.

SUMMARY

Embodiments of the present disclosure provide an information transmission method and apparatus, which can at least solve the problem in the related art of transmission conflict when transmission of different RATs overlaps in a time domain in the case of in-device coexistence.

According to some embodiments of the present disclosure, an information transmission method is provided, which includes that: in a case where first wireless transmission and second wireless transmission overlap in a time domain, the following processing is performed, the first wireless transmission including first wireless signal transmission and/or first wireless channel transmission and the second wireless transmission including second wireless signal transmission and/or second wireless channel transmission: comparing a first priority value corresponding to the first wireless transmission with a second priority value corresponding to the second wireless transmission, and discarding the wireless transmission corresponding to a higher priority value; or, comparing the first priority value corresponding to the first wireless transmission with a parameter value A, in a case where the first priority value is greater than or equal to the parameter value A, discarding the first wireless transmission, otherwise, discarding the second wireless transmission, wherein the first priority value is contained in control information corresponding to the first wireless transmission, and the second priority value is contained in control information corresponding to the second wireless transmission.

According to some other embodiments of the present disclosure, an information transmission method is also provided, which includes that: in a case where first wireless sending and second wireless reception overlap in a time domain, the following processing is performed, the first wireless sending including first wireless signal sending and/or first wireless channel sending and the second wireless reception including second wireless signal reception and/or second wireless channel reception: comparing a first priority value corresponding to the first wireless sending with a second priority value corresponding to the second wireless reception, and discarding the wireless sending corresponding to a higher priority value, or, discarding the wireless reception corresponding to a higher priority value;

or, comparing the first priority value corresponding to the first wireless sending with a parameter value A, in a case where the first priority value is greater than or equal to the parameter value A, discarding the first wireless sending, otherwise, discarding the second wireless reception;

or, comparing the second priority value corresponding to the second wireless reception with a parameter value B, in a case where the second priority value is greater than or equal to the parameter value B, discarding the second wireless reception, otherwise, discarding the first wireless sending, wherein the first priority value is contained in control information corresponding to the first wireless sending, and/or the second priority value is contained in control information corresponding to the second wireless reception;

the first wireless sending includes one of: service signal and/or channel sending, or synchronization signal and/or channel sending; and the second wireless reception includes one of: service signal and/or channel reception, or synchronization signal and/or channel reception.

According to some other embodiments of the present disclosure, an information transmission apparatus is also provided, which includes: a first detection module, configured to, in a case of detecting that first wireless transmission and second wireless transmission overlap in a time domain, trigger a first processing module or a second processing module, the first wireless transmission including first wireless signal transmission and/or first wireless channel transmission and the second wireless transmission including second wireless signal transmission and/or second wireless channel transmission; the first processing module, configured to compare a first priority value corresponding to the first wireless transmission with a second priority value corresponding to the second wireless transmission, and discard the wireless transmission corresponding to a higher priority value; and the second processing module, configured to compare the first priority value corresponding to the first wireless transmission with a parameter value A, in a case where the first priority value is greater than or equal to the parameter value A, discard the first wireless transmission, otherwise, discard the second wireless transmission, wherein the first priority value is contained in control information corresponding to the first wireless transmission, and the second priority value is contained in control information corresponding to the second wireless transmission.

According to some other embodiments of the present disclosure, an information transmission apparatus is also provided, which includes: a second detection module, configured to, in a case of detecting that first wireless sending and second wireless reception overlap in a time domain, trigger a third processing module or a fourth processing module or a fifth processing module, the first wireless sending including first wireless signal sending and/or first wireless channel sending and the second wireless reception including second wireless signal reception and/or second wireless channel reception; the third processing module, configured to compare a first priority value corresponding to the first wireless sending with a second priority value corresponding to the second wireless reception, and discard the wireless sending corresponding to a higher priority value, or, discard the wireless reception corresponding to a higher priority value; the fourth processing module, configured to compare the first priority value corresponding to the first wireless sending with a parameter value A, in a case where the first priority value is greater than or equal to the parameter value A, discard the first wireless sending, otherwise, discard the second wireless reception; and the fifth processing module, configured to compare the second priority value corresponding to the second wireless reception with a parameter value B, in a case where the second priority value is greater than or equal to the parameter value B, discard the second wireless reception, otherwise, discard the first wireless sending, wherein the first priority value is contained in control information corresponding to the first wireless sending, and the second priority value is contained in control information corresponding to the second wireless reception; the first wireless sending includes one of: service signal and/or channel sending, or synchronization signal and/or channel sending; and the second wireless reception includes one of: service signal and/or channel reception, or synchronization signal and/or channel reception.

According some other embodiments of the present disclosure, a computer-readable storage medium is also provided, in which a computer program is stored, the computer program being configured to run to execute the operations in any above-mentioned method embodiment.

According to some other embodiments of the present disclosure, an electronic apparatus is also provided, which includes a memory and a processor. A computer program is stored in the memory. The processor is configured to run the computer program to execute the operations in any above-mentioned method embodiment.

Through the embodiments of the present disclosure, in a case where first wireless transmission and second wireless transmission overlap in a time domain, the following processing is performed: comparing a first priority value corresponding to the first wireless transmission with a second priority value corresponding to the second wireless transmission, and discarding the wireless transmission corresponding to a higher priority value; or, comparing the first priority value corresponding to the first wireless transmission with a parameter value A, in a case where the first priority value is greater than or equal to the parameter value A, discarding the first wireless transmission, otherwise, discarding the second wireless transmission. With the adoption of the above-mentioned solution, in a case where two pieces of wireless sending overlap in the time domain, priority values are compared to determine the wireless sending to be reserved or the wireless sending to be discarded. The problem in the related art of transmission conflict when transmission of different RATs overlaps in a time domain in the case of in-device coexistence is solved.

BRIEF DESCRIPTION OF THE DRAWINGS

The drawings described herein are used to provide a further understanding to the present disclosure and form a part of the present disclosure. Schematic embodiments of the present disclosure and descriptions thereof are used to explain the present disclosure and not intended to form improper limits to the present disclosure. In the drawings.

DETAILED DESCRIPTION

The present disclosure will be described below with reference to the drawings and in combination with the embodiments in detail. It is to be noted that the embodiments in the present disclosure and characteristics in the embodiments may be combined without conflicts.

It is to be noted that terms "first", "second" and the like in the specification, claims and drawings of the present disclosure are adopted not to describe a specific sequence or order but to distinguish similar objects.

There is provided a mobile communication network (including, but not limited to, a 5th-Generation (5G) mobile communication network) in some embodiments of the present disclosure. The network architecture of the network may include a network-side device (e.g., a base station) and a UE. In the embodiments, an information transmission method capable of running in the network architecture is provided. It is to be noted that the running environments of the information transmission method provided in the embodiments of the present disclosure are not limited to the above network architecture.

Figure 1:
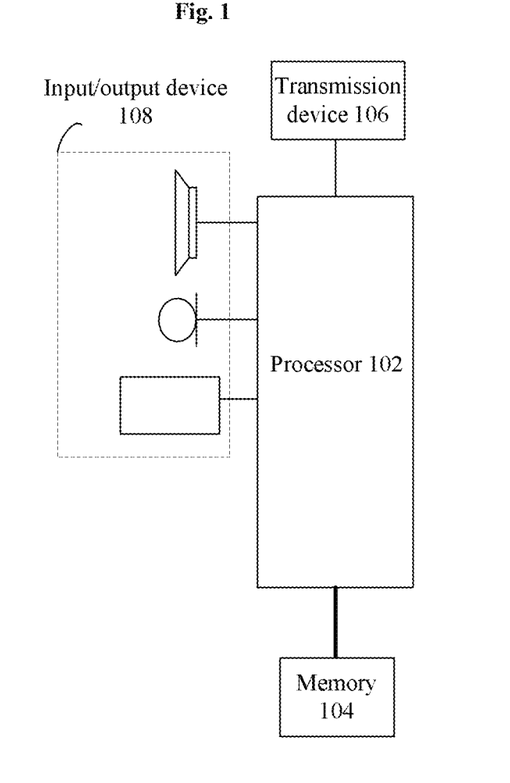
FIG. 1 is a hardware structure block diagram of a mobile terminal for implementing an information transmission method according to some embodiments of the present disclosure.

The method embodiments of the present disclosure may be executed in a mobile terminal, a computer terminal or a similar computing apparatus. Taking running in a mobile terminal as an example, FIG. 1 is a hardware structure block diagram of a mobile terminal for implementing an information transmission method according to some embodiments of the present disclosure. The mobile terminal may include one or more (only one is shown in FIG. 1) processors 102 (the processor 102 may include, but not limited to, a processing apparatus such as a Micro Controller Unit (MCU) or a Field Programmable Gate Array (FPGA)) and a memory 104 configured to store data. In some exemplary implementations, the mobile terminal may further include a transmission device 106 and input/output device 108 configured for a communication function. Those of ordinary skill in the art should know that the structure shown in FIG. 1 is only schematic and not intended to limit the structure of the mobile terminal. For example, the mobile terminal may further include components more or fewer than those shown in FIG. 1 or adopts a configuration different from that shown in FIG. 1.

The memory 104 may be configured to store a software program of application software and a module, for example, a program instruction/module corresponding to the information transmission method in the embodiments of the present disclosure. The processor 102 runs the software program and module stored in the memory 104, thereby executing various functional disclosures and data processing, namely implementing the above-mentioned method. The memory 104 may include a high-speed Random Access Memory (RAM) or a nonvolatile memory, for example, one or more magnetic storage apparatuses, flash memories or other nonvolatile solid-state memories. In some examples, the memory 104 may further include a memory arranged remotely relative to the processor 102, and the remote memory may be connected to the mobile terminal through a network. An example of the network includes, but not limited to, the Internet, an intranet of an enterprise, a local area network, a mobile communication network, and a combination thereof.

The transmission device 106 is configured to receive or send data through a network. A specific example of the network may include a wireless network provided by a communication provider of the mobile terminal. In an example, the transmission device 106 includes a Network Interface Controller (NIC), which may be connected with another network device through a base station, thereby communicating with the Internet. In an example, the transmission device 106 may be a Radio Frequency (RF) module, configured to communicate with the Internet in a wireless manner.

Figure 2:
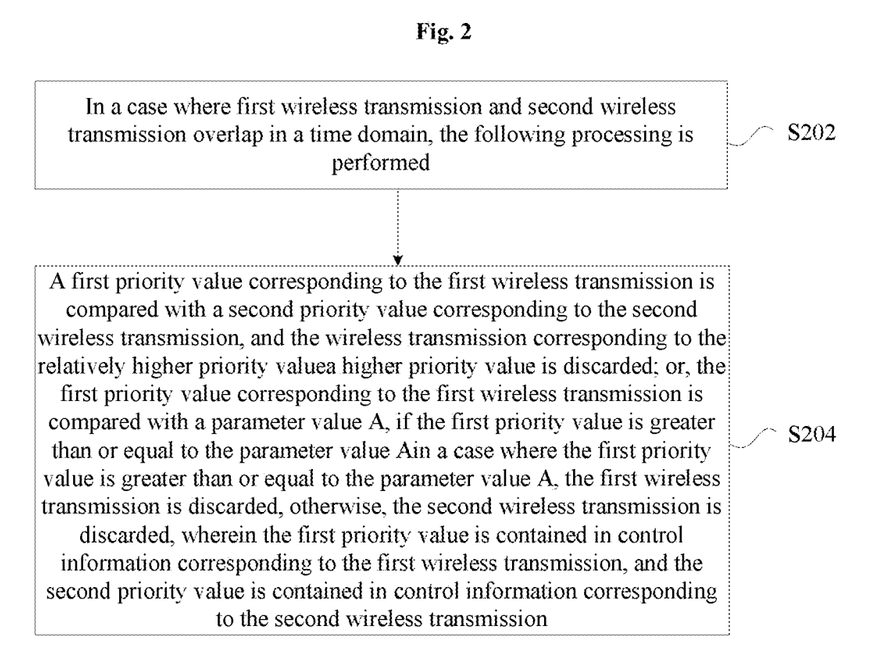
FIG. 2 is a flowchart of an information transmission method according to some embodiments of the present disclosure.

In the embodiments, an information transmission method running in the above-mentioned mobile terminal is provided. FIG. 2 is a flowchart of an information transmission method according to some embodiments of the present disclosure. As shown in FIG. 2, the flow includes the following operations S202 and S204.

At S202, in a case where first wireless transmission and second wireless transmission overlap in a time domain, the following processing in operation S204 is performed.

The first wireless transmission includes first wireless signal transmission and/or first wireless channel transmission. The second wireless transmission includes second wireless signal transmission and/or second wireless channel transmission.

At S204, a first priority value corresponding to the first wireless transmission is compared with a second priority value corresponding to the second wireless transmission, and the wireless transmission corresponding to a higher priority value is discarded; or, the first priority value corresponding to the first wireless transmission is compared with a parameter value A, in a case where the first priority value is greater than or equal to the parameter value A, the first wireless transmission is discarded, otherwise, the second wireless transmission is discarded. In the embodiments, the first priority value is contained in control information corresponding to the first wireless transmission, and the second priority value is contained in control information corresponding to the second wireless transmission.

In some exemplary implementations, a first wireless signal and/or channel may be a signal and/or channel in LTE, or a signal and/or channel in an NR system; and a second wireless signal and/or channel may be a signal and/or channel in the NR system, or a signal and/or channel in LTE.

With the adoption of the above-mentioned solution, in a case where two pieces of wireless sending overlap in the time domain, priority values are compared to determine the wireless sending to be reserved or the wireless sending to be discarded. The problem in the related art of transmission conflict when transmission of different RATs overlaps in a time domain in the case of in-device coexistence is solved.

In some exemplary implementations, the first wireless transmission includes one of UL transmission of UE or SL transmission. The SL transmission includes at least one of: Physical Sidelink Shared Channel (PSSCH) transmission of mode 1 or mode 2 or mode 3 or mode 4, mode 1, mode 2, mode 3 and mode 4 being modes of a PSSCH; Physical Sidelink Control Channel (PSCCH) transmission; and Physical Sidelink Feedback Channel (PSFCH) transmission.

In some exemplary implementations, the second wireless transmission includes at least one of: SLSS transmission; PSBCH transmission; SLSS and PSBCH block transmission; PSFCH transmission; and PSSCH transmission of mode 1 or mode 2 or mode 3 or mode 4, mode 1, mode 2, mode 3 and mode 4 being SL communication modes.

In some exemplary implementations, the control information includes one of physical Sidelink Control Information (SCI), Downlink Control Information (DCI), UL control information, or a high-layer parameter.

In some exemplary implementations, the parameter value A is a high-layer parameter value, and is determined by high-layer configuration or predefinition.

In some exemplary implementations, the first wireless transmission and the second wireless transmission are on a same carrier or different carriers.

In some exemplary implementations, in a case where the second wireless transmission is SLSS transmission, or PSBCH transmission, or SLSS and PSBCH block transmission, at least one of the followings is further included. The second priority value is determined according to a configuration or pre-configuration, or is a predefined value or a fixed value. Different features correspond to different second priority values, wherein that different features correspond to different second priority values includes at least one of the followings: different SL synchronization reference sources correspond to different second priority values; different SL synchronization stage numbers or hop numbers or synchronization priorities correspond to different second priority values; and different RATs correspond to different second priority values.

In some exemplary implementations, in a case where the first wireless transmission is PSFCH transmission, or, in a case where the second wireless transmission is PSFCH transmission, the method further includes at least one of the followings:
the first priority value or the second priority value is determined according to a configuration or pre-configuration, or is a predefined value or a fixed value; and
the first priority value or the second priority value is determined according to a priority value of PSSCH transmission associated with the PSFCH transmission, including that: the first priority value or the second priority value is equal to the priority value of the associated PSSCH transmission, or, the first priority value or the second priority value is higher than or lower than the priority value of the associated PSSCH transmission by N, N being a positive integer. A PSSCH associated with the PSFCH transmission includes a received or sent PSSCH.

In some exemplary implementations, the operation that a first priority value corresponding to the first wireless transmission is compared with a second priority value corresponding to the second wireless transmission includes that: the second priority value is mapped to a first set that the first priority value belongs to, the first set referring to a set including all possible first priority values, and a second set referring to a set including all possible second priority values. A mapping method includes that: the values in the second set are sequentially mapped to the values in the first set from small to large values, and all values, beyond the number of the priority values in the first set, in the second set are mapped to a maximum value in the first set; or, the values in the second set are sequentially mapped to the values in the first set from large to small values, and all values, beyond the number of the priority values in the first set, in the second set are mapped to a minimum value in the first set; or, a quantization granularity M is set, M being a positive integer, and in a case where a minimum difference between the values in the second set and the values in the first set is less than or equal to M, a corresponding value in the second set is mapped to a corresponding value in the first set.

According to some other embodiments of the present disclosure, another information transmission method is provided, which includes the following first to fourth operations.

At a first operation, in a case where first wireless sending and second wireless reception overlap in a time domain, one of the following processing in the second to fourth operations is performed.

The first wireless sending includes first wireless signal sending and/or first wireless channel sending. The second wireless reception includes second wireless signal reception and/or second wireless channel reception.

At a second operation, a first priority value corresponding to the first wireless sending is compared with a second priority value corresponding to the second wireless reception, and the wireless sending corresponding to a higher priority value is discarded, or, the wireless reception corresponding to a higher priority value is discarded.

At a third operation, the first priority value corresponding to the first wireless sending is compared with a parameter value A, in a case where the first priority value is greater than or equal to the parameter value A, the first wireless sending is discarded, otherwise, the second wireless reception is discarded.

At a fourth operation, the second priority value corresponding to the second wireless reception is compared with a parameter value B, in a case where the second priority value is greater than or equal to the parameter value B, the second wireless reception is discarded, otherwise, the first wireless sending is discarded.

The first priority value is contained in control information corresponding to the first wireless sending; and/or, the second priority value is contained in control information corresponding to the second wireless reception.

The first wireless sending includes one of: service signal and/or channel sending, or synchronization signal and/or channel sending. The second wireless reception includes one of: service signal and/or channel reception, or synchronization signal and/or channel reception.

With the adoption of the above-mentioned solution, in a case where two pieces of wireless sending overlap in the time domain, priority values are compared to determine the wireless sending to be reserved or the wireless sending to be discarded. The problem in the related art of transmission conflict when transmission of different RATs overlaps in a time domain in the case of in-device coexistence is solved.

In some exemplary implementations, the service signal and/or channel sending or the service signal and/or channel reception includes one of: UL sending or reception of UE; or SL sending or reception. The SL sending or reception includes at least one of: PSSCH sending or reception of mode 1 or mode 2 or mode 3 or mode 4; PSCCH sending or reception; and PSFCH sending or reception.

In some exemplary implementations, the synchronization signal and/or channel sending or the synchronization signal and/or channel reception includes at least one of: SLSS sending or reception; PSBCH sending or reception; and SLSS and PSBCH block sending or reception.

In some exemplary implementations, the control information includes one of physical SCI, DCI, UL control information, or a high-layer parameter.

In some exemplary implementations, at least one of the parameter values A and B (i.e., the parameter A and/or the parameter B) is a high-layer parameter value, and is determined by high-layer configuration or predefinition.

In some exemplary implementations, the first wireless sending and the second wireless reception are on a same carrier or different carriers.

In some exemplary implementations, in a case where the synchronization signal and/or channel sending or the synchronization signal and/or channel reception is SLSS sending or reception, or PSBCH sending or reception, or SLSS and PSBCH block sending or reception, at least one of the followings is further included: a third priority value is determined according to a configuration or pre-configuration, or is a predefined value or a fixed value; and different features correspond to different third priority values. That different features correspond to different third priority values includes at least one of the followings: different SL synchronization reference sources correspond to different third priority values; different SL synchronization stage numbers or hop numbers or synchronization priorities correspond to different third priority values; and different RATs correspond to different third priority values, wherein the third priority value is one of the first priority value or the second priority value.

In some exemplary implementations, in a case where the service signal and/or channel sending or the service signal and/or channel reception is PSFCH sending or reception, the method further includes at least one of the followings: a third priority value is determined according to a configuration or pre-configuration, or is a predefined value or a fixed value; and the third priority value is determined according to a priority value of PSSCH transmission associated with PSFCH transmission, including that: the third priority value is equal to the priority value of the associated PSSCH transmission, or, the third priority value is higher than or lower than the priority value of the associated PSSCH transmission by N, N being a positive integer. A PSSCH associated with the PSFCH transmission includes a received or sent PSSCH.

The third priority value is one of the first priority value and the second priority value.

In some exemplary implementations, in a case where the first wireless sending is the service signal/channel sending and the second wireless reception is the synchronization signal and/or channel reception, the operation that a first priority value corresponding to the first wireless sending is compared with a second priority value corresponding to the second wireless reception includes that: the second priority value is mapped to a first set that the first priority value belongs to, the first set referring to a set including all possible first priority values, and a second set referring to a set including all possible second priority values. A mapping method includes that: the values in the second set are sequentially mapped to the values in the first set from small to large values, and all values, beyond the number of the priority values in the first set, in the second set are mapped to a maximum value in the first set; or, the values in the second set are sequentially mapped to the values in the first set from large to small values, and all values, beyond the number of the priority values in the first set, in the second set are mapped to a minimum value in the first set; or, a quantization granularity M is set, M being a positive integer, and in a case where a minimum difference between the values in the second set and the values in the first set is less than or equal to M, a corresponding value in the second set is mapped to a corresponding value in the first set.

In some exemplary implementations, in a case where the first wireless sending is the synchronization signal and/or channel sending and the second wireless reception is the service signal/or channel reception, the operation that a first priority value corresponding to the first wireless sending is compared with a second priority value corresponding to the second wireless reception includes that: the first priority value is mapped to a second set that the second priority value belongs to, the second set referring to a set including all possible second priority values, and a first set referring to a set including all possible first priority values. A mapping method includes that: the values in the first set are sequentially mapped to the values in the second set from small to large values, and all values, beyond the number of the priority values in the second set, in the first set are mapped to a maximum value in the second set; or, the values in the first set are sequentially mapped to the values in the second set from large to small values, and all values, beyond the number of the priority values in the second set, in the first set are mapped to a minimum value in the second set; or, a quantization granularity M is set, M being a positive integer, and in a case where a minimum difference between the values in the first set and the values in the second set is less than or equal to M, a corresponding value in the first set is mapped to a corresponding value in the second set.

Descriptions will now be made in combination with some other embodiments of the present disclosure.

Scenario hypothesis: LTE V2X and NR V2X exist in the same UE and work on different carriers of the same band. In a case where an SL synchronization resource of one RAT overlaps a resource of a service channel of the other RAT, the following sending solutions are used according to different sending and reception conditions.

Solution 1): priorities of sending/reception of synchronization signals/channels are indicated.

In a case where the service channel (e.g., a PSSCH) sending resource overlaps the SL synchronization resource, priorities of the service channel and an SL synchronization signal/channel are compared.

The SL synchronization resource may be configured for SL synchronization signal/channel sending or SL synchronization signal/channel reception.

The priority of the SL synchronization signal/channel is determined by predefinition or configuration or pre-configuration.

For the priority of the SL synchronization signal/channel, at least one of the followings is included: the priority of the SL synchronization signal/channel is fixed (namely the SL synchronization signal/channel has only one priority); different synchronization reference sources correspond to different priorities (namely the SL synchronization signal/channel has multiple priorities, and different synchronization reference sources correspond to different priorities); different stage numbers (e.g., direct synchronization to a Global Navigation Satellite System (GNSS) and indirect synchronization to the GNSS) of a highest synchronization source (a base station, the GNSS or UE) correspond to different priorities of the SL synchronization signal/channel; and different RATs correspond to different priorities of SL synchronization signals/channels (e.g., a synchronization signal/channel of NR V2X and a synchronization signal/channel of LTE V2X).

A value of the priority of the SL synchronization signal/channel is not greater than a maximum value of the priority of the SL service channel (a PSSCH of NR V2X or LTE V2X (a PSSCH with a relatively high priority)) and not smaller than a minimum value of the priority of the SL service channel.

The operation that priorities of the service channel and an SL synchronization signal/channel are compared includes that: in a case where the priority of the service channel is higher than the priority of the SL synchronization signal/channel, the service channel is sent, and/or the SL synchronization signal/channel is not sent (is dropped); and in a case where the priority of the service channel is not higher than the priority of the SL synchronization signal/channel, the SL synchronization signal/channel is sent, and/or the service channel is not sent (is dropped).

The service channel and the SL synchronization signal/channel may be on a same carrier or different carriers.

Solution 2): a priority threshold and a comparison priority of the service channel are configured.

A judgment threshold A is configured or pre-configured. When the service channel is sent, in a case where the sending resource overlaps the SL synchronization resource, the priority of the service channel is compared with the judgment threshold A, including that: in a case where the priority of the service channel is higher than the judgment threshold A, the service channel is sent, and/or the SL synchronization signal/channel is not sent (is dropped); otherwise, the SL synchronization signal/channel is sent, and/or, the service channel is not sent (is dropped).

The service channel and the SL synchronization signal/channel may be on a same carrier or different carriers.

Solution 3): 8 logical channel priority values {1,2,3,4,5,6,7,8} are defined in LTE and 16 logical channel priority values {1,2,3, . . . ,15,16} are defined in NR. For a synchronization signal/channel SLSS/PSBCH of LTE V2X, a priority P1 is a value ranging from 1 to 8. For a synchronization signal/channel S-SSB of NR V2X, a priority P2 is a value ranging from 1 to 16. Priority level numbers of LTE V2X and NR V2X are different, so it is necessary to establish a mapping relationship therebetween (between priority values of LTE V2X and priority values of NR V2X), including that: based on one-to-one mapping of the priority values, 1 to 8 are mapped to 1 to 8, and the priority values 9 to 16 of NR V2X are directly determined to be smaller than the priority value 8 in LTE V2X; based on one-to-one mapping of the priority values, the priority values 9 to 16 of NR V2X are mapped to the priority values 1 to 8 of LTE V2X, and the priority values 1 to 8 of NR V2X are directly determined to be greater than the priority value 1 in LTE V2X; or the priority values 1 and 2 of NR V2X are mapped to the priority value 1 of LTE V2X, the priority values 3 and 4 of NR V2X are mapped to the priority value 2 of LTE V2X in the same manner, and by parity of reasoning, the priority values 15 and 16 of NR V2X are mapped to the priority value 8 of LTE V2X, namely priority values 2n−1 and 2n of NR V2X are mapped to a priority value n of LTE V2X, n being a positive integer ranging from 1 to 8.

Solution 4): the priority of sending or reception of the SL synchronization signal/channel may be fixedly higher than the priority of sending or reception of the service channel, namely the SL synchronization signal/channel is preferentially sent or received by default. Different priorities may be set for the sending and reception of the SL synchronization signal/channel. One manner is to increase the priority of sending of the SL synchronization signal/channel so as to ensure that the SL synchronization signal/channel is sent to rapidly synchronize other UE nearby rapidly. For example, the priority of sending of the SL synchronization signal/channel is higher than the priority of reception of the SL synchronization signal/channel by 2 and not greater than a maximum priority value.

Solution 5): the above-described SL synchronization signal/channel includes at least one of an S-SSB, an SLSS (a PSSS or an SSSS), and a PSBCH.

Solution 6): for the reception of the SL synchronization signal/channel, in a case where a receiving resource overlaps the sending resource of the SL synchronization signal/channel and the UE receives (detects) the synchronization signal/channel on the overlapping resource, the priority of reception of the SL synchronization signal/channel is compared with the priority of sending of the service channel, and the sending or reception (detection) processing corresponding to the higher priority is reserved. Alternatively, the priority of the service channel is compared with a configured or pre-configured judgment threshold, the sending of the service channel is reserved in a case where the priority of the service channel is higher than or not lower than the judgment threshold, and the reception (detection) of the synchronization signal/channel is reserved.

Solution 7): in a case where there are multiple synchronization resources in an SL synchronization cycle, for a synchronization resource not sending the SL synchronization signal/channel, the priority of the service channel is compared with the priority of reception of the SL synchronization signal/channel, or the priority of the service channel is compared with a configured or pre-configured judgment threshold, and the sending of the service channel is reserved in a case where the priority of the service channel is not lower than the priority of reception of the SL synchronization signal/channel or not lower than the configured or pre-configured judgment threshold.

Solution 8): in a case where a resource for sending the SL synchronization signal/channel (first signal/channel) overlaps a resource for sending or receiving another signal/channel (second signal/channel, including a PSFCH, an SL Channel-State Information Reference Signal (CSI-RS), an SL Phase-Tracking Reference Signal (PT-RS) and a PSCCH), a priority of sending or reception of the other signal/channel is compared with the priority of sending of the SL synchronization signal/channel, or the priority of sending of the other signal/channel is compared with a value of a configured or pre-configured judgment threshold. In a case where the priority of sending or reception of the other signal/channel is higher than or not lower than the priority of sending of the SL synchronization signal/channel or the priority of sending or reception of the other signal/channel is higher than or not lower than the judgment threshold, the sending or reception of the other signal/channel is reserved.

Solution 9): the descriptions in solution 8 are applied to the reception (detection) of the SL synchronization signal/channel. The priority of reception of the SL synchronization signal/channel may be different from the priority of sending of the SL synchronization signal/channel.

Solution 10): it is defined that a priority of a PSFCH is associated with the priority of a corresponding PSSCH, including: the same as the priority of the corresponding PSSCH, associated with the priority of the corresponding PSSCH, and increased or decreased based on the priority of the corresponding PSSCH.

Some other embodiments of the present disclosure includes the following several embodiments.

Embodiment 1

Figure 3:
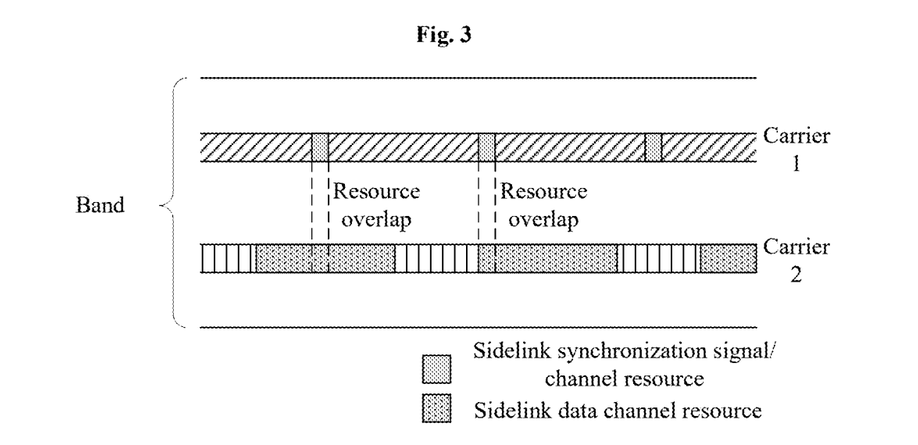
FIG. 3 is a schematic diagram of overlapping of SL synchronization resources on different carriers according to some other embodiments of the present disclosure.

A wireless signal/channel sending method is described in the embodiment. Descriptions are made taking the sending of an SL signal and/or channel as an example, as shown in FIG. 3. LTE V2X and NR V2X exist in the same UE and work on different carriers (carrier 1 and carrier 2) of the same band respectively. In a case where a service signal and/or channel sent by one RAT overlaps with an SL synchronization signal/channel sent by the other RAT in a time domain, the UE determines whether to send the service signal and/or channel according to a priority judgment result, or may further determine whether to send and/or receive the SL synchronization signal/channel. The above-mentioned overlapping in the time domain may be understood as that wireless resources sending the signals and/or the channels overlap in the time domain. The above-mentioned priority judgment result includes a judgment result obtained by comparing a priority value of the service signal and/or channel and a priority value of the SL synchronization signal/channel. The above-mentioned operation that the UE determines whether to send the service signal and/or channel according to a priority judgment result specifically includes that: in a case where the priority value of the service signal and/or channel is smaller than or not greater than the priority of the SL synchronization signal/channel, the service signal and/or channel is sent, or the sending of the SL synchronization signal/channel is discarded, otherwise, the sending of the service signal and/or channel is discarded, or the SL synchronization signal/channel is sent. The above-mentioned operation that whether to send and/or receive the SL synchronization signal/channel may further be determined specifically includes that: in a case where the priority value of the service signal and/or channel is not smaller than or greater than the priority of the SL synchronization signal/channel, the SL synchronization signal/channel is sent and/or received, or the sending of the service signal and/or channel is discarded, otherwise, the sending and/or reception of the SL synchronization signal/channel are/is discarded, or the service signal and/or channel is sent.

In the example shown in FIG. 3, there is made such a hypothesis that an SL synchronization resource on carrier 1 overlaps an SL data channel resource on carrier 2. Here, the SL service channel may be a PSSCH, and/or a PSCCH, and/or a PSFCH. In an example, in a case where an overlapping resource on carrier 2 sends a PSSCH of NR V2X, and/or an overlapping resource on carrier 1 sends an SLSS/PSBCH of LTE V2X, the overlapping resource herein refers to that a service channel resource and synchronization signal/channel resource on different carriers overlap in the time domain. A priority of the PSSCH of NR V2X is compared with the priority of the SLSS/PSBCH of LTE V2X, and whether to send the SL data channel is determined according to a priority comparison result. For example, in a case where a value of the priority of the PSSCH of NR V2X is smaller than or not greater than the priority of the priority of the SLSS/PSBCH of LTE V2X, the PSSCH of NR V2X is sent, or the sending or reception of the SLSS/PSBCH of LTE V2X is discarded. Otherwise, the sending of the PSSCH of NR V2X is discarded, or the SLSS/PSBCH of LTE V2X is sent or received.

The service signal/channel described in the embodiments includes an SL service signal/channel, such as a PSSCH, and also includes a service signal/channel for cellular communication, such as a Physical Uplink Shared Channel (PUSCH). The embodiment is also applied to the determination of whether to receive the service signal/channel, specifically including that: in a case where the priority of the service signal/channel is known and the value of the priority of the service signal/channel is smaller than or not greater than the value of the priority of the SL synchronization signal/channel, the service signal and/or channel is received, or the sending and/or reception of the SL synchronization signal or channel are/is discarded, otherwise, the reception of the service signal and/or channel is discarded, or the SL synchronization signal/channel is sent or received. The following operation may further be included: in a case where the priority of the service signal/channel is unknown, the reception of the service signal and/or channel is discarded, or the SL synchronization signal/channel is sent and/or received. An object knowing the priority of the service signal/channel or not knowing the priority of the service signal/channel may refer to the UE or a RAT module. The SL synchronization signal/channel described in the embodiments includes an SLSS/PSBCH of LTE V2X and an S-SSB of NR V2X.

The priority of the signal/channel described in the embodiments may be determined according to high-layer configuration signaling or a pre-configuration, or is a fixed value, or is determined according to physical-layer indication information, for example, determined according to an indication of DCI or SCI.

The priority of the PSSCH described in the embodiments is indicated by a PSCCH or SCI corresponding to the PSSCH. The condition that the sent or received channel is standalone SCI is also applied to the example of the embodiment.

The descriptions are made in the embodiments taking the service signal and/or channel and the SL synchronization signal and/or channel as an example. However, the method of the embodiment is also applied to the condition of including a PSFCH.

Embodiment 2

A method for determining a priority of a wireless signal/channel is described in the embodiments, including how to determine a priority of an SL synchronization signal/channel. Descriptions are made taking an SLSS/PSBCH of LTE V2X as an example. A priority of the SLSS/PSBCH is determined according to a synchronization reference source that UE sending the SLSS/PSBCH is synchronized to. Synchronization to different synchronization reference sources may correspond to different priorities of the SLSS/PSBCH.

Figure 4:
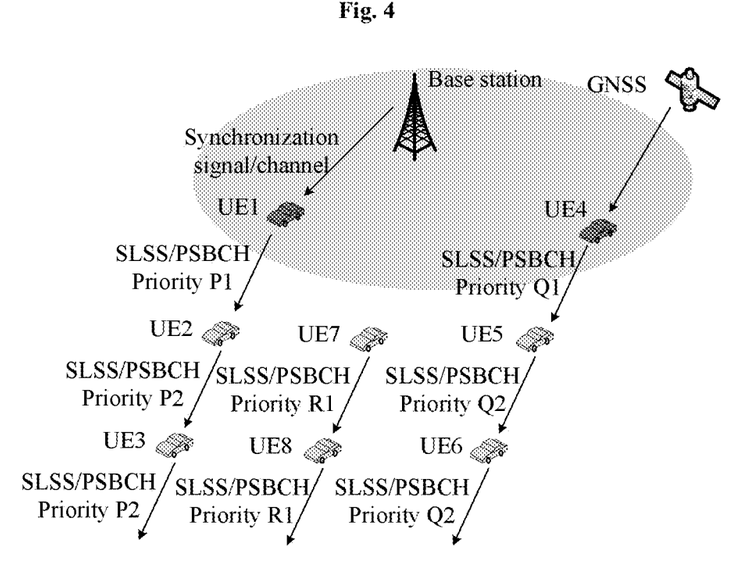
FIG. 4 is a schematic diagram of Embodiment 2 according to some other embodiments of the present disclosure.

For example, as shown in FIG. 4, in a case where the UE sending the SLSS/PSBCH is synchronized to timing of a base station (e.g., an Evolved Node B (eNB) or a gNB) directly, a value of a corresponding priority of sending and/or reception of the SLSS/PSBCH is P1. In a case where the UE sending the SLSS/PSBCH is synchronized to the timing of the base station (e.g., the eNB or the gNB) indirectly, including synchronization to the timing of the base station by detecting a synchronization signal forwarded by other UE, the other UE herein including UE synchronized to the base station (e.g., the eNB or the gNB) directly or indirectly, a value of a corresponding priority of sending and/or reception of the SLSS/PSBCH is P2. In a case where the UE sending the SLSS/PSBCH is synchronized to external unified timing (e.g., a GNSS) directly, a value of a corresponding priority of sending and/or reception of the SLSS/PSBCH is Q1. In a case where the UE sending the SLSS/PSBCH is synchronized to the external unified timing (e.g., the GNSS) indirectly, including synchronization to the external unified timing by detecting a synchronization signal forwarded by other UE, the other UE herein including UE synchronized to the external unified timing (e.g., the GNSS) directly or indirectly, a value of a corresponding priority of sending and/or reception of the SLSS/PSBCH is Q2. In a case where the UE sending the SLSS/PSBCH is synchronized to other timing (e.g., timing of independent UE), including direct or indirect synchronization to the other timing, a value of a corresponding priority of sending and/or reception of the SLSS/PSBCH is R1.

The descriptions are made in the embodiments taking the SLSS/PSBCH of LTE V2X as an example. It is to be noted that the embodiment is also applied to the determination of a priority of an S-SSB of NR V2X.

Embodiment 3

A method for determining a priority of a wireless signal/channel is described in the embodiments, including how to determine a priority of an SL synchronization signal/channel. Descriptions are made taking an SLSS/PSBCH of LTE V2X as an example. A priority of the SLSS/PSBCH is determined according to a synchronization reference stage number (or hop number) corresponding to UE sending the SLSS/PSBCH. Different synchronization reference stage numbers may correspond to different priorities of the SLSS/PSBCH.

Figure 5:
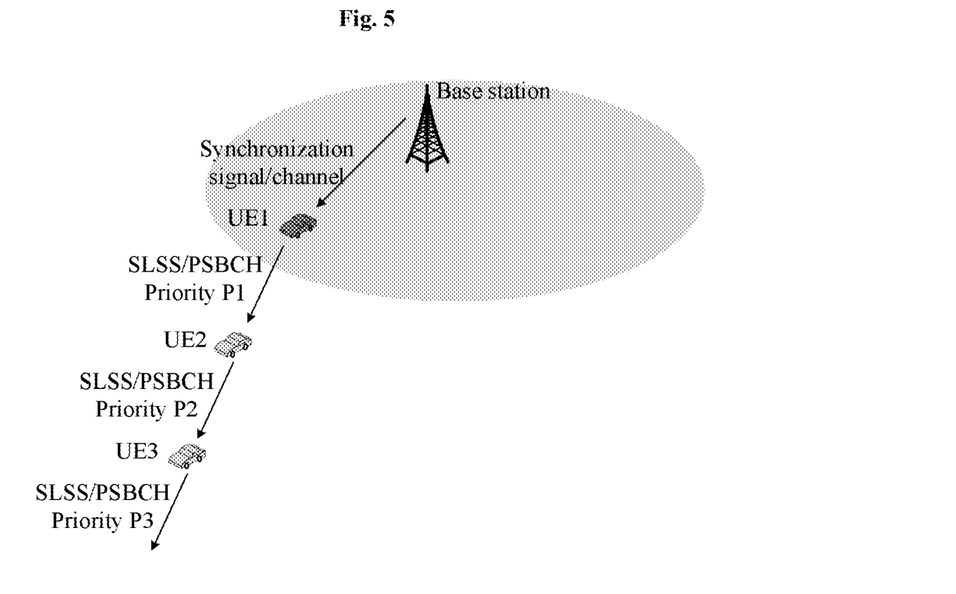
FIG. 5 is a schematic diagram of Embodiment 3 according to some other embodiments of the present disclosure.

For example, as shown in FIG. 5, in a case where the UE sending the SLSS/PSBCH is a first-stage synchronization reference, for example, synchronized to a base station (an eNB or a gNB) or a GNSS, a value of a corresponding priority of sending and/or reception of the SLSS/PSBCH is P1. In a case where the UE sending the SLSS/PSBCH is a second-stage synchronization reference, namely the UE is synchronized to the first-stage synchronization reference, a value of a corresponding priority of sending and/or reception of the SLSS/PSBCH is P2. In a case where the UE sending the SLSS/PSBCH is a third-stage synchronization reference, namely the UE is synchronized to the second-stage synchronization reference, a value of a corresponding priority of sending and/or reception of the SLSS/PSBCH is P3. By parity of reasoning, a value of a priority of sending and/or reception of the SLSS/PSBCH corresponding to UE that is an N-stage synchronization reference may be determined as PN, N being a positive integer. Alternatively, a priority of sending and/or reception of the SLSS/PSBCH corresponding to UE that is a synchronization reference after an Mth stage may be determined as PM, M being a positive integer.

The descriptions are made in the embodiments taking the SLSS/PSBCH of LTE V2X as an example. It is to be noted that the embodiment is also applied to the determination of a priority of an S-SSB of NR V2X.

Embodiment 4

A method for determining a priority of a wireless signal/channel is described in the embodiments, including how to determine a priority of an SL synchronization signal/channel. Descriptions are made taking an SLSS/PSBCH of LTE V2X and an S-SSB of NR V2X as an example. A priority of an SL synchronization signal/channel is determined according to a RAT corresponding to the sent SL synchronization signal/channel. Different RATs correspond to different priorities of SL synchronization signals/channels.

For example, a priority of the SLSS/PSBCH of LTE V2X is Q1, and a priority of the S-SSB of NR V2X is Q2. In a case that a sending resource of a data channel overlaps a resource of an SL synchronization signal/channel in a time domain, when priority judgment is performed on the data channel, during comparison, the SL synchronization signal/channel corresponds to priority Q1 if being an SLSS/PSBCH of LTE V2X, and the SL synchronization signal/channel corresponds to priority Q2 if being an S-SSB of NR V2X.

In the embodiments, values of Q1 and Q2 may be fixed values or configured values.

Embodiment 5

A wireless signal/channel sending method is described in the embodiments, including the comparison between a priority of a service signal and/or channel and a judgment threshold A. The judgment threshold A is determined according to a configuration or pre-configuration, or determined according to physical-layer indication information, for example, determined according to an indication of DCI or SCI. On a resource overlapping a resource of an SL synchronization signal/channel, a priority of a service signal/channel to be sent is compared with the judgment threshold A to determine whether to send the service signal and/or channel. Specifically, in a case where a value of the priority is smaller than or not greater than the value of the judgment threshold A, the service signal and/or channel is sent, or the sending or reception of the SL synchronization signal and/or channel is discarded. Otherwise, the sending of the service signal and/or channel is discarded, or the SL synchronization signal and/or channel is sent or received.

In an example, NR V2X and LTE V2X exist in the same UE1, a PSSCH of NR V2X is sent on carrier 1, and a sending resource overlaps a resource for sending or receiving an SLSS/PSBCH of LTE V2X on carrier 1 in a time domain. The UE compares magnitudes of a priority of the PSSCH to be sent and a judgment threshold A. A value of A is determined according to a configuration or pre-configuration, or determined according to physical-layer indication information. In a case where a value of the priority of the PSSCH to be sent is 1, the value of the configured or pre-configured judgment threshold A is 4, and a priority mapping rule is that a priority is higher in a case where a value of the priority is smaller, it may be determined that the priority of the PSSCH to be sent of NR V2X is higher than the judgment threshold A. In such case, the PSSCH of NR V2X is sent on carrier 2, and/or the sending or reception of the SLSS/PSBCH of LTE V2X is discarded on the overlapping resource on carrier 1.

The condition that the sent or received channel is stand-alone SCI is also applied to the method of the embodiment.

The method of the embodiment is applied not only to the condition that NR V2X and LTE V2X exist in the same UE but also to the condition that SL communication and cellular communication, e.g., SL data transmission and cellular UL transmission, exist in the same UE as well as the condition of existing on different carriers or the same carrier.

In another example, NR V2X and UL transmission exist in the same UE2, an S-SSB of NR V2X is sent on carrier 2, and a resource of the UL transmission (e.g., a PUSCH) on carrier 1 overlaps a resource for sending or receiving the S-SSB on carrier 2. The UE compares magnitudes of a priority of the PUSCH to be sent and a judgment threshold A. In a case where a value of the priority of the PUSCH to be sent is 2, the value of the configured or pre-configured judgment threshold A is 3, and a priority mapping rule is that a priority is higher in a case where a value of the priority is smaller, it may be determined that the priority of the PUSCH to be sent of the UL transmission is higher than the judgment threshold A. In such case, the PSSCH of NR V2X is sent on carrier 1, and/or the sending or reception of the S-SSB of NR V2X is discarded on the overlapping resource on carrier 2.

The priority of the PSSCH described in the embodiments is indicated by a PSCCH corresponding to the PSSCH.

Embodiment 6

A wireless signal/channel sending method is described in the embodiments, including the association of a priority of a wireless signal and/or channel 2 and a priority of a wireless signal and/or channel 1. The following operations are included: the priority of the wireless signal and/or channel 2 is determined according to the priority of the wireless signal and/or channel 1, including that the priority of the wireless signal and/or channel 2 is the same as the priority of the wireless signal and/or channel 1 or adjusted based on the priority of the wireless signal and/or channel 1; or priority comparison is not performed on the wireless signal and/or channel 2, and the same sending or reception processing as the wireless signal and/or channel 1 is performed. The priority of the signal and/or channel described herein may be a priority of sending or a priority of reception or a priority of sending and reception. The signal and/or channel 1 and signal and/or channel 2 described herein may be sent signals and/or channels or received signals and/or channels.

For example, a priority of a PSFCH is the same as the priority of a PSSCH. Alternatively, in a case where a feedback content includes an Acknowledgment (ACK) or a Negative Acknowledgment (NACK), the priority of the PSFCH is the same as the priority of a PSSCH corresponding to the ACK or the NACK. The PSFCH and PSSCH described herein are on the same carrier. A sent PSFCH and a received PSSCH correspond to each other. That is, a sent PSFCH corresponds to a received PSSCH, and a received PSFCH corresponds to a sent PSSCH. The above-described PSSCH corresponding to the ACK or the NACK may refer to this corresponding relationship.

For another example, a PSFCH sent on carrier 1 uses the same priority as received PSSCH1, and overlaps a resource for sending PSSCH2 on another carrier. In a case where a priority of PSSCH1 is higher than a priority of PSSCH2, a priority of the PSFCH is regarded as being higher than a priority of PSSCH2. Alternatively, in a case where an ACK or NACK carried by the PSFCH on carrier 1 corresponds to PSSCH1, the same processing as PSSCH1 is performed on the PSFCH. In other words, the PSFCH is sent in a case where PSSCH1 is sent, and sending of the PSFCH is discarded in a case where sending of PSSCH1 is discarded.

The priority of the PSSCH described in the embodiments is indicated by a PSCCH corresponding to the PSSCH.

Embodiment 7

A wireless signal/channel sending method may further include that: a priority of sending of a wireless signal and/or channel is determined according to a sending mode or carried content of the wireless signal and/or channel. For example, in a case where a content sent by a PSFCH includes a NACK only, namely only the NACK is fed back (for example, a feedback mode of NR V2X is option 1), the PSFCH has the same priority as a corresponding PSSCH. That is, on the same carrier, a priority of a sent PSFCH is the same as a priority of a corresponding received PSSCH, and a priority of a received PSFCH is the same as a priority of a corresponding sent PSSCH. Whether to send or received the PSFCH is determined based on a priority comparison result of the PSFCH and another signal and/or channel. For example, the PSFCH is sent or received in a case where the priority of the PSFCH is higher (for example, a value of the priority is smaller). The other signal and/or channel herein may be on the same carrier or a different carrier, and overlaps a resource of the PSFCH in a time domain.

For another example, in a case where a content sent by a PSFCH is an ACK, namely only the content sent by the PSFCH may include the ACK or a NACK (for example, a feedback mode of NR V2X is option 2), the PSFCH has the same priority as a corresponding PSSCH. That is, on the same carrier, a priority of a sent PSFCH is the same as a priority of a corresponding received PSSCH, and a priority of a received PSFCH is the same as a priority of a corresponding sent PSSCH. Alternatively, a priority of a sent PSFCH is adjusted (relative to a priority of a corresponding PSSCH on the same carrier). For example, the priority is decreased or increased. In an example, a received PSFCH has the same priority as a corresponding sent PSSCH on the same carrier, and whether to receive the PSFCH is determined based on a priority comparison result of the PSFCH and another signal and/or channel. For example, the PSFCH is received in a case where the priority of the PSFCH is higher. The other signal and/or channel herein may be on the same carrier or a different carrier, and overlaps a resource of the PSFCH in a time domain. In another example, for a sent PSFCH, a priority of the PSFCH is determined according to a sent content. In a case where the sent content is an ACK, the PSFCH has the same priority as a corresponding received PSSCH on the same carrier, and whether to send the PSFCH is determined based on a priority comparison result of the PSFCH and another signal and/or channel. For example, the PSFCH is sent in a case where the priority of the PSFCH is higher. The other signal and/or channel herein may be on the same carrier or a different carrier, and overlaps a resource of the PSFCH in a time domain. In a case where the sent content is a NACK, the priority of the PSFCH is decreased, for example, to a minimum priority, and whether to send the PSFCH is determined based on a priority comparison result of the PSFCH and another signal and/or channel.

In another example, in a case where a PSSCH is received on the same carrier, a priority of a corresponding sent PSFCH is adjusted, for example, the priority of the corresponding sent PSFCH is maximized. Alternatively, in a case where sending or reception of a PSFCH overlaps a resource of a PSSCH of LTE V2X, the PSSCH of LTE V2X is preferentially sent or received. LTE V2X and the PSFCH may be on a same carrier or different carriers.

The priority of the PSSCH described in the embodiments is indicated by a PSCCH corresponding to the PSSCH.

Embodiment 8

It is described in the embodiments that resources for sending or receiving an SLSS and/or PSBCH of LTE V2X and an S-SSB of NR V2X overlap in a time domain, including on a same carrier or different carriers. Whether to send or receive the SLSS and/or PSBCH and the S-SSB may be determined based on priority comparison. For example, a priority value of the SLSS and/or the PSBCH is 3, and a priority value of the S-SSB is 4. Priority comparison shows that a priority of the SLSS and/or the PSBCH is higher. In such case, UE sends the SLSS and/or the PSBCH. Alternatively, priorities of transmission of one or two RATs may be fixed to be higher than the priority of another RAT. For example, a priority of sending and/or reception of the SLSS and/or the PSBCH is kept higher than a priority of sending and/or reception of the S-SSB. Alternatively, a priority of the SLSS and/or the PSBCH is fixed to be a priority value and compared with a priority of the S-SSB. Alternatively, each of priorities of the SLSS and/or the PSBCH and the S-SSB is determined as a priority value, and the priority values are compared.

Embodiment 9

It is described in the embodiments that resources for sending or receiving an SLSS and/or PSBCH of LTE V2X and a PSFCH of NR V2X overlap in a time domain. A priority of sending or reception of the SLSS and/or the PSBCH is compared with a priority of sending and/or reception of the PSFCH. A priority is higher in a case where a value of the priority is smaller. The sending or reception corresponding to the higher priority is reserved according to priority comparison.

In another manner, a priority of sending or reception of the PSFCH is compared with a value of a judgment threshold. In a case where a value of the priority of sending or reception is smaller than or not greater than the judgment threshold, the sending or reception of the PSFCH is reserved. Otherwise, the SLSS and/or the PSBCH are/is sent or received.

In some embodiments, in a case where resources for sending or receiving an SLSS and/or PSBCH of LTE V2X and a PSFCH of NR V2X overlap in a time domain, the SLSS and/or the PSBCH are/is preferentially sent or received. Alternatively, a priority value of the SLSS and/or the PSBCH of LTE V2X is determined as a fixed value and compared with a priority value of sending or reception of the PSFCH. The example is also applied to the sending or reception of an S-SSB of NR V2X.

Embodiment 10

The determination of a priority of SL sending and/or reception is described in the embodiments, including at least one of the following manners.

A value of a priority of sending or reception of an SL synchronization signal and/or channel is defined to be a certain value in an effective value range of priority values of logical channels or logical channel groups. For example, a priority value of a synchronization signal and/or channel SLSS/PSBCH of LTE V2X is defined to be one of 1 to 8, e.g., 3. Alternatively, a priority of sending and priority of reception of the SLSS/PSBCH may be defined respectively, and the defined priorities may be the same value or different values. For example, a value of the priority of sending of the SLSS/PSBCH is 2, and a value of the priority of reception of the SLSS/PSBCH is 4. The SLSS includes a PSSS and/or an SSSS. In another example, a priority value of a synchronization signal and/or channel S-SSB of NR V2X is defined to be one of 1 to 16, e.g., 4. Alternatively, a priority of sending and priority of reception of the SLSS/PSBCH may be defined respectively, and the defined priorities may be the same value or different values. For example, a value of a priority of sending of the S-SSB is 1, and a value of the priority of reception of the SLSS/PSBCH is 3.

It is defined that a priority of sending or reception of a PFSCH is the same as or associated with a priority value of a PSSCH. The PSSCH corresponds to the PSFCH. Specifically, an ACK and/or NACK born by the PSFCH correspond to the PSSCH. For example, the priority of sending of the PSFCH is the same as a priority of an associated PSSCH received on the same carrier, and the priority of reception of the PSFCH is the same as a priority of an associated PSSCH sent on the same carrier. Alternatively, a value of the priority of sending of the PSFCH is increased or decreased by M relative to a priority value of the associated PSSCH received on the same carrier, and a value of the priority of reception of the PSFCH is increased or decreased by N relative to the priority value of the associated PSSCH sent on the same carrier, M and N being positive integers. It is ensured that the values of the priority of sending and priority of reception of the PSFCH are within an effective range.

It is defined that a priority of an SL PT-RS is the same as a priority value of an associated PSSCH. For example, in a case where a resource for sending or receiving an SL PT-RS overlaps a resource for sending or receiving another signal or channel in a time domain, the SL PT-RS is compared with a priority of the other signal or channel according to a priority of a corresponding PSSCH. Here, the other signal or channel includes one or more of an SL synchronization signal or channel, a PSFCH, a PSSCH, and a PSCCH.

A value of a priority of an SL CSI-RS is defined to be a certain value in an effective value range of priority values of logical channels or logical channel groups. For example, the value of the priority of the SL CSI-RS is defined to be one of 1 to 16, e.g., 4. Alternatively, a priority of sending and priority of reception of the SL CSI-RS may be defined respectively, and the defined priorities may be the same value or different values. For example, a value of the priority of sending of the SL CSI-RS is 1, and a value of the priority of reception of the SL CSI-RS is 3.

Embodiment 11

The comparison between priorities corresponding to different signal or channel transmission is described in the embodiment. A priority value corresponding to signal or channel transmission in LTE V2X is a value ranging from 1 to 8, and a priority value corresponding to signal or channel transmission in NR V2X is a value ranging from 1 to 16. During comparison, the two priority values are compared based on a mapping rule. The mapping rule includes one or more of the following rules.

Multiple priority values of NR V2X are mapped to a priority value of LTE V2X. Priority values 2n−1 and 2n of NR V2X are mapped to a priority value n of LTE V2X, n being a positive integer ranging from 1 to 8. For example, priority values 1 and 2 of NR V2X are mapped to priority value 1 of LTE V2X, priority values 3 and 4 of NR V2X are mapped to priority value 2 of LTE V2X, and by parity of reasoning, priority values 15 and 16 of NR V2X are mapped to priority value 8 of LTE V2X.

High priorities are mapped in an aligned manner. For example, priority values 1 to 8 of NR V2X are sequentially mapped to priority values 1 to 8 of LTE V2X respectively, and priority values 9 to 16 of NR V2X are mapped to priority value 8 of LTE V2X.

Low priorities are mapped in an aligned manner. For example, priority values 9 to 16 of NR V2X are sequentially mapped to priority values 1 to 8 of LTE V2X respectively, and priority values 1 to 8 of NR V2X are mapped to priority value 1 of LTE V2X.

Mapping is performed correspondingly according to priority values. A priority value n of LTE V2X is mapped to a priority value n of NR V2X, n being a positive integer ranging from 1 to 8. For example, priority values 1 to 8 of LTE V2X are sequentially mapped to priority values 1 to 8 of NR V2X respectively.

Mapping is performed uniformly according to priority values. A priority value n of LTE V2X is mapped to a priority value 2n or 2n−1 of NR V2X, n being a positive integer ranging from 1 to 8. For example, priority values 1 to 8 of LTE V2X are sequentially mapped to priority values 1, 3, 5, 7, 9, 11, 13 and 15 of NR V2X respectively.

The signal and/or channel transmission in the embodiments includes signal and/or channel sending or transmission.

Time-domain overlapping described in all of the above embodiments includes partial overlapping or complete overlapping of different signal and/or channel transmission (including sending or reception) or wireless resources. Discarding sending or not sending or dropping described in all the embodiments includes canceling present sending, suspending present sending, sending by rate matching, or other processing manners.

Through the descriptions about the above implementations, those skilled in the art may clearly know that the method according to the embodiment may be implemented by combining software and a required universal hardware platform, or may be implemented by hardware, of course, but the former is a exemplary implementation in many cases. Based on such an understanding, the technical solutions of the present disclosure substantially or parts making contributions to the conventional art may be embodied in form of a software product, and the computer software product is stored in a storage medium (for example, a Read-Only Memory (ROM)/RAM, a magnetic disk, and an optical disk), including a plurality of instructions configured to enable a terminal device (which may be a personal computer, a server, a network device, etc.) to execute the method in each embodiment of the present disclosure.

There is also provided an information transmission apparatus in the embodiments, which is configured to implement the above-mentioned embodiments and exemplary implementations. What has been described will not be elaborated. For example, term "module" used below may be a combination of software and/or hardware capable of realizing a preset function. Although the apparatus described in the following embodiment is preferably implemented with software, implementation with hardware or a combination of software and hardware is also possible and conceivable.

According to some other embodiments of the present disclosure, an information transmission apparatus is provided, which includes:

a first detection module, configured to, in a case of detecting that first wireless transmission and second wireless transmission overlap in a time domain, trigger a first processing module or a second processing module, the first wireless transmission including first wireless signal transmission and/or first wireless channel transmission and the second wireless transmission including second wireless signal transmission and/or second wireless channel transmission;

the first processing module, configured to compare a first priority value corresponding to the first wireless transmission with a second priority value corresponding to the second wireless transmission, and discard the wireless transmission corresponding to a higher priority value; and the second processing module, configured to compare the first priority value corresponding to the first wireless transmission with a parameter value A, in a case where the first priority value is greater than or equal to the parameter value A, discard the first wireless transmission, otherwise, discard the second wireless transmission. The first priority value is contained in control information corresponding to the first wireless transmission. The second priority value is contained in control information corresponding to the second wireless transmission.

According to some other embodiments of the present disclosure, an information transmission apparatus is also provided, which includes:

a second detection module, configured to, in a case of detecting that first wireless sending and second wireless reception overlap in a time domain, trigger a third processing module or a fourth processing module or a fifth processing module, the first wireless sending including first wireless signal sending and/or first wireless channel sending and the second wireless reception including second wireless signal reception and/or second wireless channel reception;

the third processing module, configured to compare a first priority value corresponding to the first wireless sending with a second priority value corresponding to the second wireless reception, and discard the wireless sending corresponding to a higher priority value, or, discard the wireless reception corresponding to a higher priority value;

the fourth processing module, configured to compare the first priority value corresponding to the first wireless sending with a parameter value A, in a case where the first priority value is greater than or equal to the parameter value A, discard the first wireless sending, otherwise, discard the second wireless reception; and the fifth processing module, configured to compare the second priority value corresponding to the second wireless reception with a parameter value B, in a case where the second priority value is greater than or equal to the parameter value B, discard the second wireless reception, otherwise, discard the first wireless sending.

The first priority value is contained in control information corresponding to the first wireless sending. The second priority value is contained in control information corresponding to the second wireless reception.

The first wireless sending includes one of service signal/channel sending and synchronization signal and/or channel sending. The second wireless reception includes one of: service signal and/or channel reception, or synchronization signal and/or channel reception.

It is to be noted that each of the modules may be implemented by software or hardware, and under the latter condition, may be implemented in, but not limited to, the following manner: the modules are all in the same processor, or the modules are in different processors in any combination form respectively.

An embodiment of the present disclosure also provides a computer-readable storage medium. In some exemplary implementations, in the embodiments, the storage medium may be configured to store a program code configured to execute the following operations of:

a first operation, in a case where first wireless transmission and second wireless transmission overlap in a time domain, performing the following processing in a second operation; and the second operation, comparing a first priority value corresponding to the first wireless transmission with a second priority value corresponding to the second wireless transmission, and discarding the wireless transmission corresponding to a higher priority value; or, comparing the first priority value corresponding to the first wireless transmission with a parameter value A, in a case where the first priority value is greater than or equal to the parameter value A, discarding the first wireless transmission, otherwise, discarding the second wireless transmission, wherein the first priority value is contained in control information corresponding to the first wireless transmission, and/or, the second priority value is contained in control information corresponding to the second wireless transmission.

In some exemplary implementations, in the embodiments, the storage medium may include, but not limited to, various media capable of storing program codes such as a U disk, a ROM, a RAM, a mobile hard disk, a magnetic disk or an optical disk.

An embodiment of the present disclosure also provides an electronic apparatus, which includes a memory and a processor. A computer program is stored in the memory. The processor is configured to run the computer program to execute the operations in any above-mentioned method embodiment.

In some exemplary implementations, the electronic apparatus may further include a transmission device and an input/output device. The transmission device is connected with the processor, and the input/output device is connected with the processor.

In some exemplary implementations, in the embodiments, the processor in the embodiments may be configured to execute the following operations through the computer program:
- a first operation, in a case where first wireless transmission and second wireless transmission overlap in a time domain, performing the following processing in a second operation; and
- the second operation, comparing a first priority value corresponding to the first wireless transmission with a second priority value corresponding to the second wireless transmission, and discarding the wireless transmission corresponding to a higher priority value; or, comparing the first priority value corresponding to the first wireless transmission with a parameter value A, in a case where the first priority value is greater than or equal to the parameter value A, discarding the first wireless transmission, otherwise, discarding the second wireless transmission, wherein the first priority value is contained in control information corresponding to the first wireless transmission, and/or, the second priority value is contained in control information corresponding to the second wireless transmission.

In some exemplary implementations, specific examples in the embodiments may refer to the examples described in the above-mentioned embodiments and optional implementations, and will not be elaborated in the embodiment.

It is apparent that those skilled in the art should know that each module or each operation of the present disclosure may be implemented through a universal computing device. They may be concentrated in a single computing device or distributed in a network formed by multiple computing devices. In some exemplary implementations, they may be implemented by program codes executable for the computing devices and thus may be stored in a storage device for execution with the computing devices. Moreover, in some cases, the shown or described operations may be executed in sequences different from those described here, or may form various integrated circuit modules respectively, or multiple modules or operations therein may form a single integrated circuit module for implementation. Therefore, the present disclosure is not limited to any specific hardware and software combination.

The above is only the exemplary embodiment of the present disclosure and not intended to limit the present disclosure. For those skilled in the art, the present disclosure may have various modifications and variations. Any modifications, equivalent replacements, improvements and the like made within the spirit and principle of the present disclosure shall fall within the scope of protection of the present disclosure.

What is claimed is:

1. An information transmission method, comprising:
in a case where first wireless transmission of a first Radio Access Techology (RAT) and second wireless transmission of a second RAT overlap in a time domain, the first RAT being one of a New Radio (NR) RAT and a Long Term Evolution (LTE) RAT, and the second RAT being the other one of the NR RAT and the LTE RAT, performing the following processing:
comparing a first priority value corresponding to the first wireless transmission of the first RAT with a second priority value corresponding to the second wireless transmission of the second RAT, and discarding the wireless transmission corresponding to a higher priority value; or, comparing the first priority value corresponding to the first wireless transmission of the first RAT with a parameter value A, in a case where the first priority value is greater than or equal to the parameter value A, discarding the first wireless transmission of the first RAT, otherwise, discarding the second wireless transmission of the second RAT, wherein the first wireless transmission comprises first wireless signal transmission and/or first wireless channel transmission, the second wireless transmission comprises second wireless signal transmission and/or second wireless channel transmission, and the first priority value is contained in control information corresponding to the first wireless transmission of the first RAT;
wherein
in a case where the second wireless transmission of the second RAT is Sidelink Synchronization Signal (SLSS) transmission, or Physical Sidelink Broadcast Channel (PSBCH) transmission, or SLSS and PSBCH block transmission, the second priority value of the second wireless transmission of the second RAT is determined according to a configuration or pre-configuration, or is a predefined value or a fixed value;
or,
in a caase where the first wireless tranmission of the first RAT is Physical Sidelink Feedback Channel (PSFCH) transmission, or, in a case where the second wireless transmission of the second RAT is PSFCH transmission, the first priority value or the second priority value is determinied according to a priority value of Physical Sidelink Shared Channel (PSSCH) trnasmission associated with the PSFCH transmission, comprising that: the first priority value or the second priority value is equal to the priority value of the associated PSSCH transmission, or, the first priority value or the second priority value is higher than or lower than the priority value of the associated PSSCH transmission by N, N being a pisitive integer, wherein a PSSCH associated with the PSFCH transmission comprises a received or send PSSCH.

2. The method according to claim 1, wherein the first wireless transmission comprises one of:
Uplink (UL) transmission of User Equipment (UE); or
Sidelink (SL) transmission, wherein the SL transmission comprises at least one of:
Physical Sidelink Shared Channel (PSSCH) transmission of mode 1 or mode 2 or mode 3 or mode 4;
Physical Sidelink Control Channel (PSCCH) transmission; and
Physical Sidelink Feedback Channel (PSFCH) transmission
or, the second wireless transmission comprises at least one of:
Sidelink Synchronization Signal (SLSS) transmission;
Physical Sidelink Broadcast Channel (PSBCH) transmission;
SLSS and PSBCH block transmission;
PSFCH transmission; and
PSSCH transmission of mode 1 or mode 2 or mode 3 or mode 4.

3. A non-transitory computer-readable storage medium, in which a computer program is stored, wherein the computer program is configured to run by a processor to execute the method according to claim 1.

4. The method according to claim 1, wherein the control information comprises one of physical Sidelink Control Information (SCI), Downlink Control Information (DCI), UL control information, or a high-layer parameter.

5. The method according to claim 1, wherein the parameter value A is a high-layer parameter value, and is determined by high-layer configuration or predefinition.

6. The method according to claim 1, wherein the first wireless transmission and the second wireless transmission are on a same carrier or different carriers.

7. The method according to claim 1, wherein in the case where the second wireless transmission is SLSS transmission, or the PSBCH transmission, or the SLSS and PSBCH block transmission, different features correspond to different second priority values, wherein that different features correspond to different second priority values comprises at least one of the followings:
different SL synchronization reference sources correspond to different second priority values;
different SL synchronization stage numbers or hop numbers or synchronization priorities correspond to different second priority values; and
different Radio Access Technologies (RATs) correspond to different second priority values.

8. The method according to claim 1, wherein in the case where the first wireless transmission is the PSFCH transmission, or, in the case where the second wireless transmission is PSFCH transmission, the first priority value or the second priority value is determined according to a configuration or pre-configuration, or is a predefined value of a fixed value.

9. The method according to claim 1, wherein comparing a first priority value corresponding to the first wireless transmission with a second priority value corresponding to the second wireless transmission comprises:
mapping the second priority value to a first set that the first priority value belongs to, the first set referring to a set comprising all possible first priority values, and a second set referring to a set comprising all possible second priority values,
wherein a mapping method comprises:
sequentially mapping the values in the second set to the values in the first set from small to large values, and mapping all values, beyond the number of the priority values in the first set, in the second set to a maximum value in the first set; or,
sequentially mapping the values in the second set to the values in the first set from large to small values, and mapping all values, beyond the number of the priority values in the first set, in the second set to a minimum value in the first set; or,
setting a quantization granularity M, M being a positive integer, and in a case where a minimum difference between the values in the second set and the values in the first set is less than or equal to M, mapping a corresponding value in the second set to a corresponding value in the first set.

10. An electronic apparatus, comprising a memory and a processor, wherein a computer program is stored in the memory; and the processor is configured to run the computer program to execute the method according to claims 1.

11. An information transmission method, comprising:
in a case where first wireless sending of a first Radio Access Technology (RAT) and second wireless reception of a second RAT overlap in a time domain, the first RAT being one of a New Radio (NR) RAT and a Long Term Evolution (LTE) RAT, and the second RAT being the other one of the NR RAT and the LTE RAT, performing the following processing:
comparing a first priority value corresponding to the first wireless sending of the first RAT with a second priority value corresponding to the second wireless reception of the second RAT, and discarding the wireless sending corresponding to a higher priority value, or, discarding the wireless reception corresponding to a higher priority value; or, comparing the first priority value corresponding to the first wireless sending of the first RAT with a parameter value A, in a case where the first priority value is greater than or equal to the parameter value A, discarding the first wireless sending of the first RAT, otherwise, discarding the second wireless reception of the second RAT; or, comparing the second priority value corresponding to the second wireless reception of the second RAT with a parameter value B, in a case where the second priority value is greater than or equal to the parameter value B, discarding the second wireless reception of the second RAT, otherwise, discarding the first wireless sending of the first RAT, wherein the first wireless sending comprises first wireless signal sending and/or first wireless channel sending, the second wireless reception comprises second wireless signal reception and/or second wireless channel reception, and the first priority value is contained in control information corresponding to the first wireless sending of the first RAT; the first wireless sending comprises one of: service signal and/or channel sending, or synchronization signal and/or channel sending; and the second wireless reception comprises one of: service signal and/or channel reception, or synchronization signal and/or channel reception;
wherein
in a case where the synchronization signal and/or channel sending or the synchronization signal and/or channel reception is Sidelink Synchronization Signal (SLSS) sending or reception, or Physical Sidelink Broadcast Channel (PSBCH) sending or reception, or SLSS and PSBCH block sending or reception, a third priority value is determined according to a configuration or pre-configuration, or is a predefined value or a fixed value;
or,
in a case where the service signal and/or channel sending or the service signal and/or channel reception is Physical Sidelink Feedback Channel (PSFCH) sending or reception, a third priority value is determined according to a priority value of Physical Sidelink Shared Channel (PSSCH) transmission associated with PSFCH transmission, comprising that: the third priority value is equal to the priority value of the associataed PSSCH transmission, or, the third priority value is higher than or lower than the priority value of the associated PSSCH transmission by N, N being a positive integer, wherein a PSSCH associated with the PSFCH transmission cooomprises a received or send PSSCH, wherein the third priority value is one of the first priority value or the second priority value.

12. The method according to claim 11, wherein
the service signal and/or channel sending or the service signal and/or channel reception comprises one of:
Uplink (UL) sending or reception of User Equipment (UE); or
Sidelink (SL) sending or reception,
wherein the SL sending or reception comprises at least one of:
Physical Sidelink Shared Channel (PSSCH) sending or reception of mode 1 or mode 2 or mode 3 or mode 4;
Physical Sidelink Control Channel (PSCCH) sending or reception; and
Physical Sidelink Feedback Channel (PSFCH) sending or reception;
or, the synchronization signal and/or channel sending or the synchronization signal and/or channel reception comprises at least one of:
Sidelink Synchronization Signal (SLSS) sending or reception
Physical Sidelink Broadcast Channel (PSBCH) sending or reception; and
SLSS and PSBCH block sending or reception.

13. The method according to claim 11, wherein the control information comprises one of physical Sidelink Control Information (SCI), Downlink Control Information (DCI), UL control information, or a high-layer parameter.

14. The method according to claim 11, wherein at least one of the parameter values A and B is a high-layer parameter value, and is determined by high-layer configuration or predefinition.

15. A non-transitory computer-readable storage medium, in which a computer program is stored, wherein the computer program is configured to run by a processor to execute the method according to claim 11.

16. The method according to claim 11, wherein in the case where the synchronization signal and/or channel sending or the synchronization signal and/or channel reception is SLSS sending or reception, or PSBCH sending or reception, or SLSS and PSBCH block sending or reception, different features correspond to different third priority values, wherein that different features correspond to different third priority values comprises at least one of the following:
different SL synchronization reference sources correspond to different third priority values;
different SL synchronization stage numbers or hop numbers or synchronization priorities correspond to different third priority values; and
different Radio Access Technologies (RATs) correspond to different third priority values,
wherein the third priority value is one of the first priority value or the second priority value.

17. The method according to claim 11, wherein in the case where the service signal and/or channel sending or the service signal and/or channel reception is PSFCH sending or reception, the third priority value is determined according to a configuration or pre-configuration, or is a predefined value or a fixed value.

18. The method according to claim 11, wherein in a case where the first wireless sending is the service signal/channel sending and the second wireless reception is the synchronization signal and/or channel reception, comparing a first priority value corresponding to the first wireless sending with a second priority value corresponding to the second wireless reception comprises:
mapping the second priority value to a first set that the first priority value belongs to, the first set referring to a set comprising all possible first priority values, and a second set referring to a set comprising all possible second priority values,
wherein a mapping method comprises:
sequentially mapping the values in the second set to the values in the first set from small to large values, and mapping all values, beyond the number of the priority values in the first set, in the second set to a maximum value in the first set; or,
sequentially mapping the values in the second set to the values in the first set from large to small values, and mapping all values, beyond the number of the priority values in the first set, in the second set to a minimum value in the first set; or,
setting a quantization granularity M, M being a positive integer, and in a case where a minimum difference between the values in the second set and the values in the first set is less than or equal to M, mapping a corresponding value in the second set to a corresponding value in the first set.

19. The method according to claim 11, wherein in a case where the first wireless sending is the synchronization signal and/or channel sending and the second wireless reception is the synchronization signal and/or channel sending and the second wireless reception is the service signal/or channel reception, comparing a first priority value corresponding to the first wireless sending with a second priority value corresponding to the second wireless reception comprises:
mapping the first priority value to a second set that the second priority value belongs to, the second set referring to a set comprising all possible second priority values, and a first set referring to a set comprising all possible first priority values,
wherein a mapping method comprises:
sequentially mapping the values in the first set to the values in the second set from small to large values, and mapping all values, beyond the number of the priority values in the second set, in the first set to a maximum value in the second set; or,
sequentially mapping the values in the first set to the values in the second set from large to small values, and mapping all values, beyond the number of the priority values in the second set, in the first set to a minimum value in the second set; or,
setting a quantization granularity M, M being a positive integer, and in a case where a minimum difference between the values in the first set and the values in the second set is less than or equal to M, mapping a corresponding value in the first set to a corresponding value in the second set.

20. An electronic apparatus, comprising a memory and a processor, wherein a computer program is stored in the memory; and the processor is configured to run the computer program to execute the method according to claim 11.

* * * * *